US012620247B2

(12) United States Patent
Stoia

(10) Patent No.: US 12,620,247 B2
(45) Date of Patent: May 5, 2026

(54) CODING DATA INTO A HANDWRITTEN SAMPLE

(71) Applicant: Microchip Technology Incorporated, Chandler, AZ (US)

(72) Inventor: Valentin Stoia, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 357 days.

(21) Appl. No.: 18/199,403

(22) Filed: May 19, 2023

(65) Prior Publication Data

US 2024/0087348 A1 Mar. 14, 2024

Related U.S. Application Data

(60) Provisional application No. 63/404,886, filed on Sep. 8, 2022.

(51) Int. Cl.
| | |
|---|---|
| *G06V 30/224* | (2022.01) |
| *B43K 29/08* | (2006.01) |
| *G06F 3/0346* | (2013.01) |
| *G06F 3/0354* | (2013.01) |
| *G06F 3/038* | (2013.01) |

(52) U.S. Cl.
CPC ............ *G06V 30/224* (2022.01); *B43K 29/08* (2013.01); *G06F 3/0346* (2013.01); *G06F 3/03545* (2013.01); *G06F 3/038* (2013.01)

(58) Field of Classification Search
CPC .................................................. G06V 30/224
See application file for complete search history.

(56) References Cited

U.S. PATENT DOCUMENTS

| | | | |
|---|---|---|---|
| 2014/0232701 A1* | 8/2014 | Draper | .................. G06F 3/0393 |
| | | | 345/179 |
| 2015/0169056 A1* | 6/2015 | Weddle | ..................... G06T 7/90 |
| | | | 345/173 |
| 2017/0018150 A1 | 1/2017 | Kim et al. | .................. 340/407.1 |
| 2017/0364167 A1* | 12/2017 | Ribeiro | ................. G06F 3/0442 |
| 2018/0081456 A1* | 3/2018 | Li | .......................... G06F 3/0383 |
| 2019/0278893 A1* | 9/2019 | Eisen | .................. G06F 3/03545 |
| 2021/0072848 A1* | 3/2021 | Fujisawa | ............. G06F 3/03545 |
| 2021/0182372 A1 | 6/2021 | Park et al. | |
| 2021/0406514 A1 | 12/2021 | Nunally | |
| 2022/0261570 A1 | 8/2022 | Pelissier et al. | |

FOREIGN PATENT DOCUMENTS

| | | |
|---|---|---|
| EP | 3575993 B1 | 1/2022 |
| WO | 02/093351 A1 | 11/2002 |

OTHER PUBLICATIONS

"Long-term authenticity of electronic signatures with ISO standard," ISO, URL: https://www.iso.org/news/2013/02/Ref1706.html, 3 pages, Feb. 20, 2013.
International Search Report and Written Opinion, Application No. PCT/US2023/032160, 16 pages, Dec. 8, 2023.

* cited by examiner

*Primary Examiner* — Chun-Nan Lin
(74) *Attorney, Agent, or Firm* — SLAYDEN GRUBERT BEARD PLLC

(57) ABSTRACT
Teachings of the present disclosure include systems and/or methods for encoding digital data into a handwritten sample. An example method includes: accessing a predetermined vibration pattern stored in a memory corresponding to defined data; and vibrating a stylus based on the predetermined vibration pattern during creation of the handwritten sample to encode the defined data into the handwriting sample.

20 Claims, 4 Drawing Sheets

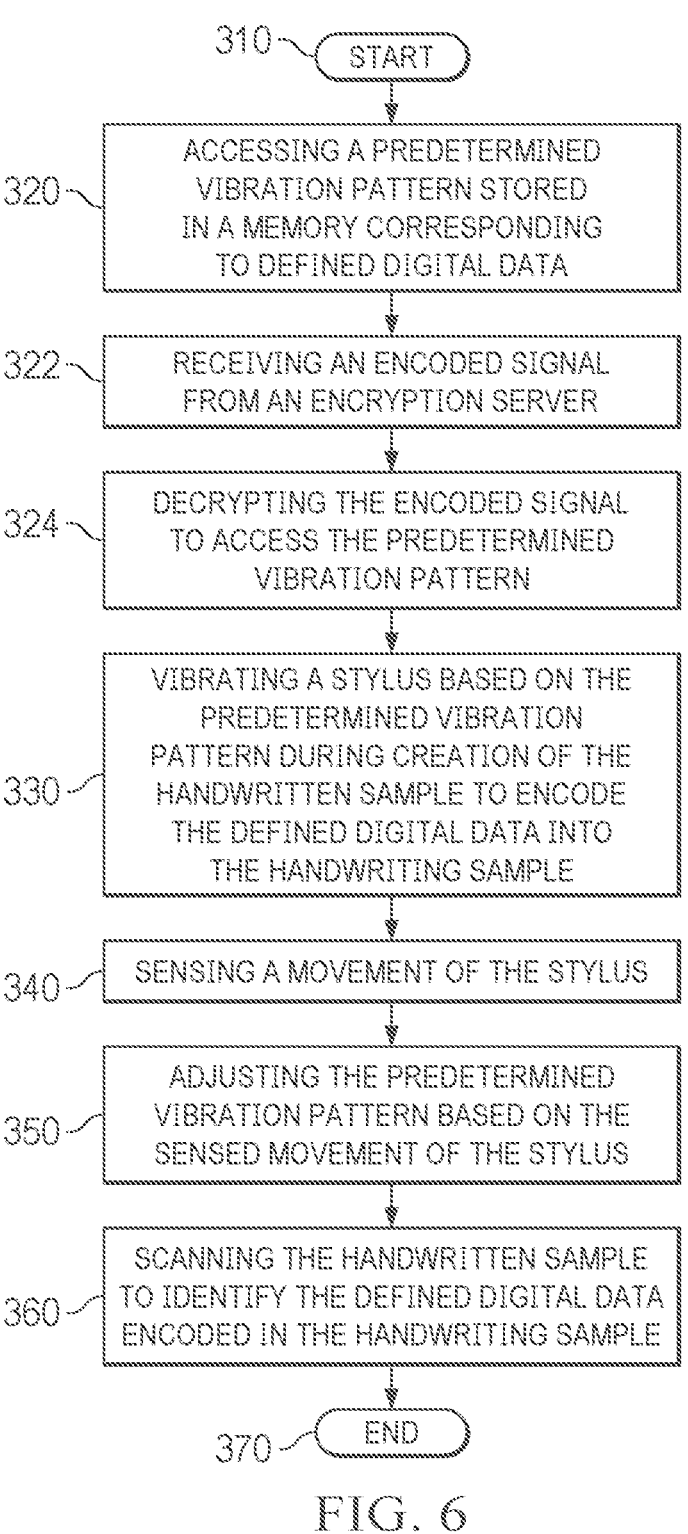

310 — START

320 — ACCESSING A PREDETERMINED VIBRATION PATTERN STORED IN A MEMORY CORRESPONDING TO DEFINED DIGITAL DATA

322 — RECEIVING AN ENCODED SIGNAL FROM AN ENCRYPTION SERVER

324 — DECRYPTING THE ENCODED SIGNAL TO ACCESS THE PREDETERMINED VIBRATION PATTERN

330 — VIBRATING A STYLUS BASED ON THE PREDETERMINED VIBRATION PATTERN DURING CREATION OF THE HANDWRITTEN SAMPLE TO ENCODE THE DEFINED DIGITAL DATA INTO THE HANDWRITING SAMPLE

340 — SENSING A MOVEMENT OF THE STYLUS

350 — ADJUSTING THE PREDETERMINED VIBRATION PATTERN BASED ON THE SENSED MOVEMENT OF THE STYLUS

360 — SCANNING THE HANDWRITTEN SAMPLE TO IDENTIFY THE DEFINED DIGITAL DATA ENCODED IN THE HANDWRITING SAMPLE

370 — END

FIG. 6

CODING DATA INTO A HANDWRITTEN SAMPLE

PRIORITY

This application claims priority to U.S. Provisional Patent Application No. 63/404,886 filed Sep. 8, 2022, the contents of which are hereby incorporated in their entirety.

TECHNICAL FIELD

The present disclosure relates to coding data into a handwritten sample. Various examples of the teachings herein include vibration-based certification of handwriting and signatures.

BACKGROUND

Typically, it is assumed one can authenticate handwriting or signatures through graphology and handwriting analysis. Given the proliferation of scanning and access to high resolution photography, it is increasingly simple to replicate a signature or larger samples of handwriting. This renders such assumptions unviable.

SUMMARY

The teachings of the present disclosure include systems and/or methods for coding data into a handwritten sample. The digital data may increase the security or credibility of the sample. The extra level of authenticity can be digitally verified, without reference to handwriting experts or other specialized resources. Further, use of such a sample may reduce the need for stamps or reference numbers.

For example, an apparatus incorporating teachings of the present disclosure may include: a stylus; a vibrating mass; and a control circuit to actuate the vibrating mass to vibrate the stylus according to a predetermined pattern.

As another example, an apparatus incorporating teachings of the present disclosure may include a wearable device comprising: a housing attachable to a user; a vibrating mass; and a control circuit to actuate the vibrate mass to vibrate the housing according to a predetermined pattern.

As another example, a method for encoding data into a handwritten sample may include: accessing a predetermined vibration pattern stored in a memory corresponding to defined digital data; and vibrating a stylus based on the predetermined vibration pattern during creation of the handwritten sample to encode the defined digital data into the handwriting sample.

BRIEF DESCRIPTION OF THE DRAWINGS

The teachings of the present disclosure include systems and/or methods for coding digital data into a handwritten sample. In the drawings:

FIG. 6 is a flowchart showing an example method incorporating teachings of the present disclosure.

DETAILED DESCRIPTION

The teachings of the present disclosure include hand-held or wearable devices used to make a writing hand, or the object or stylus itself, vibrate while writing, in order to incorporate a second layer of information stored in a handwritten sample. The applied vibration pattern (e.g., a predetermined set of frequency and amplitude variations) may encode a set of data (e.g., digital or otherwise) used as proof of authenticity of the handwriting sample and/or signature. The vibration pattern may be applied by haptic or electro-mechanical methods, such as those used on smartphones for example using a miniature direct current motor or a piezo-electric actuator.

The vibrations of the device cause variations within the signature or handwriting that may be used as a second layer of information. For example, segments of a drawn line may be shaky or not shaky, based upon vibrations applied by the device. In some examples, the shaky part of the drawn line can be interpreted as a digital 1 and a non-shaky can be interpreted as a digital 0. Vibration encoded data may further be encrypted as a hash to interfere with replication efforts.

The vibrating device can be implemented on, for example, a smart wearable device, such as a ring, a smart watch, a bracelet, or a glove, without limitation, in which case the vibration is sent through the hand down to an ordinary writing implement, such as a pen, a pencil, or a stylus, without limitation, while writing. The vibrating device may be implemented on a pencil, a pen, or a stylus, without limitation, which for security reasons may also be fitted with a user lock or unlock mechanism, such as biometric (fingerprint scan) or input (seed) for generating a hash (such as digit buttons). The input seed may be used to generate particular vibrations or frequencies or amplitudes.

Data encoded in the handwritten sample may be analyzed in any suitable manner, with any suitable device (e.g., devices fitted with a camera and imaging processing software) that can identify and decode the vibration-based data encoded in the sample. Vibration-based encrypted/hashed data can be decrypted or checked for validity through pre-agreed procedures and algorithms within private applications, legally approved organizations, or government institutions. For example, corporate or government entities may analyze the data in a handwriting sample to validate legal instruments, contracts, or checks, without limitation.

As hand movement may not have a constant speed (to allow a well-timed data insertion), the 'vibration' insertion speed may be adjusted based on the readings of an accelerometer embedded in the vibrating device.

Figure 1:
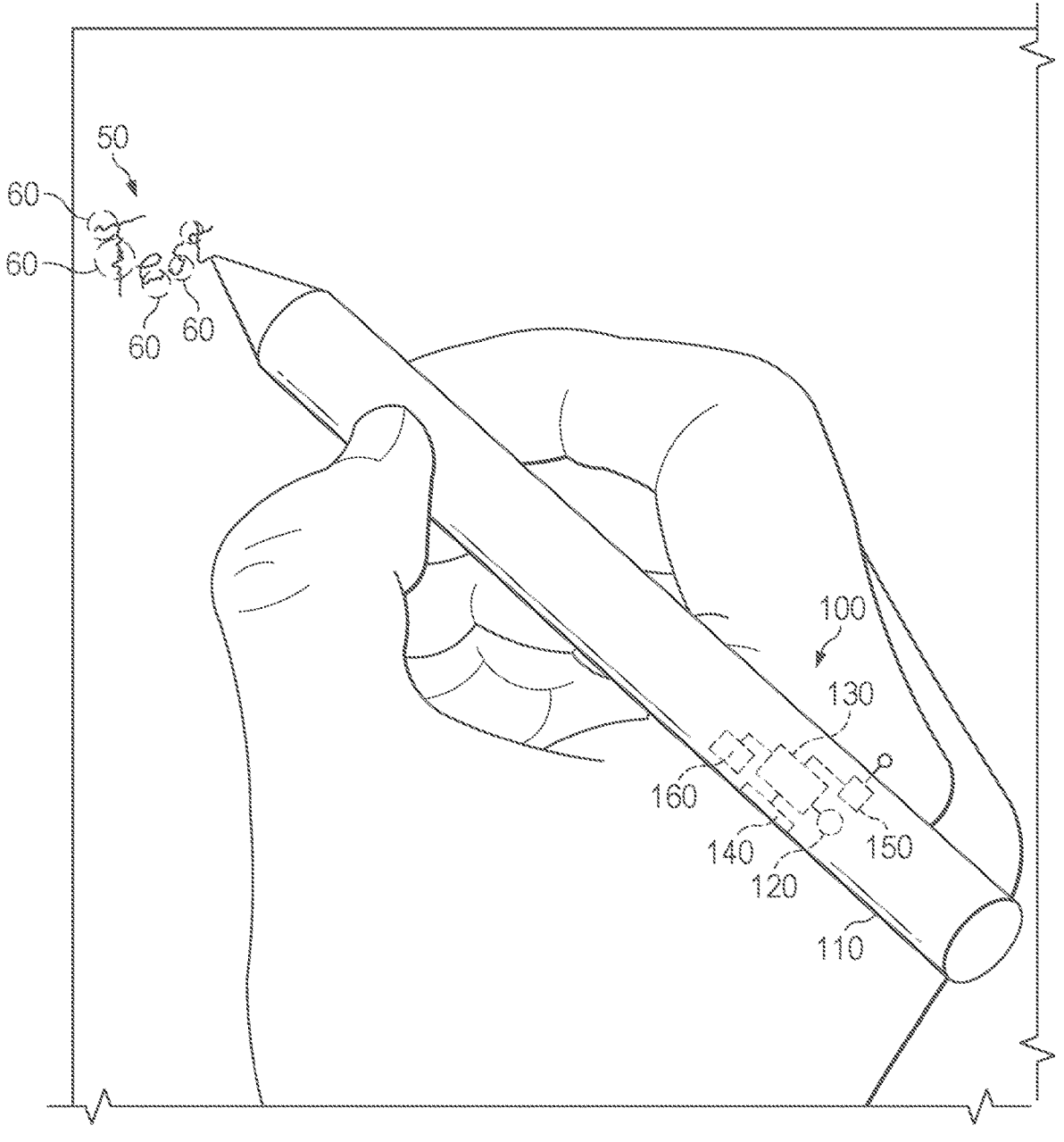
FIG. 1 is a schematic drawing showing the use of an example system incorporating teachings of the present disclosure.

FIG. 1 is a schematic drawing showing the use of an example apparatus 100 incorporating teachings of the present disclosure. As shown in FIG. 1, a handwriting sample 50 includes data 60 encoded into the sample according to the teachings of the present disclosure. The apparatus 100 includes a stylus 110, a vibrating mass 120, a control circuit 130, a lock 140, a communication interface 150, and an accelerometer 160.

The stylus 110 may include any device operable by a user to create a handwritten sample. For example, the stylus 110 may include a pen or pencil to create a traditional handwritten sample on a paper (e.g., dispensing ink or graphite). In some embodiments, the stylus 110 may not dispense any material on the writing surface (e.g., a system wherein movement of the stylus is sensed by a tablet).

The vibrating mass 120 may be any object suitable to cause vibration of the stylus 110. Some examples include masses rotating off-center, as shown in FIG. 1. Other examples may include masses translating side-to-side across the central length of the stylus 110, e.g., a piezoelectric actuator. The vibrating mass 120 may be similar to that used in cellular phones and other devices to provide vibrations while in "silent mode".

The control circuit 130 may include any component or combination of components to actuate the vibrating mass 120 according to a pattern. For example, the control circuit may include a system on chip, an application specific integrated circuit, a field programmable gate array, a micro-controller, a processor and instructions stored in a memory for execution by a processor, analog circuitry, digital circuitry, reprogrammable or programmable hardware, or any suitable combination thereof.

In some embodiments, the control circuit 130 may be external to the stylus 110, e.g., the vibrating mass 120 may be driven by a smartphone or another computing device. As an alternative, the control circuit 130 may apply a controlled electric charge to the stylus 110. The electric charge may operate to shock the user while providing the handwriting sample, thereby causing controlled contraction of the muscles and providing perturbations to the user's normal handwriting motion.

The lock 140 may include any component to allow or restrict access to the apparatus 100. For example, the lock 140 may include a user lock or unlock mechanism, such as biometric (fingerprint scan) or input (seed) for generating a hash (such as digit buttons).

The communication interface 150 may include an interface for cloud/internet uplink. The communication interface 150 may be used to access a predetermined pattern for vibrating the vibrating mass 120 from a remote source. For example, if the apparatus 100 is usable to create validated or verifiable samples for more than one verifying entity, the apparatus 100 may use the communication interface 150 to access predetermined vibration patterns for each of the relevant entities.

The accelerometer 160 may include any device and/or circuitry to detect the motion and patterns of the handwriting sample 50. The detected motion and patterns may be used to adapt the vibration pattern to the actual speed of the user.

Figures 2, 3:
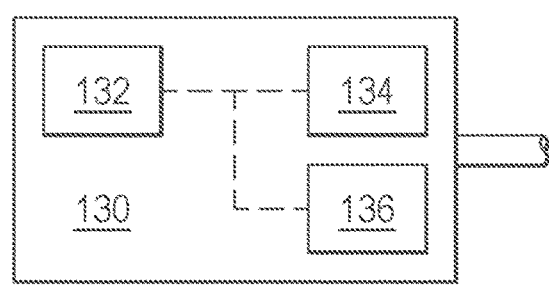
FIG. 2 is a schematic drawing showing an example control circuit for use with the system of FIG. 1.
FIG. 3 is a schematic drawing showing the use of another example apparatus incorporating teachings of the present disclosure.

FIG. 2 is a schematic drawing showing an example control circuit 130 for use with the apparatus 100 of FIG. 1. The control circuit 130 may include, for example, a microcontroller (MCU) 132 (with data encryption capability), a cryptography chip for validity/authentication (like the ATECC608 available from Microchip Technology, Inc. of Chandler, Arizona), and an actuator 134/136 (for the actual vibration). FIG. 2 shows the MCU 132 driving either a DC current motor 134 or a piezoelectric actuator 136.

FIG. 3 is a schematic drawing showing the use of another example apparatus 200 incorporating teachings of the present disclosure to embed data in a handwriting sample 50. The apparatus 200 includes a housing 210 attachable to a user. In this example, the housing 210 includes a finger band. Other examples may include a ring, a smart watch, a bracelet, or a glove, without limitation.

Figures 4, 5:
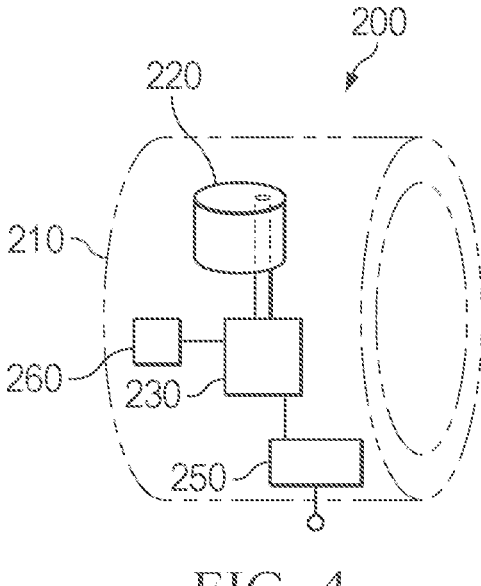
FIG. 4 is a schematic drawing showing some details of the example apparatus of FIG. 3.
FIG. 5 is a schematic drawing showing an example control circuit for use with the apparatus of FIG. 4.

FIG. 4 is a schematic drawing showing some details of the example system of FIG. 3. The system 200 includes a housing 210 attachable to a user, a vibrating mass 220, a control circuit 230, a communication interface 250, and an accelerometer 260.

The housing 210 may include any device attachable to a user and effective to apply the vibrations to the handwriting sample. For example, the housing 210 may include a watch, a bracelet, a ring, without limitation.

The vibrating mass 220 may be any object suitable for causing vibration of the housing 210. Some examples include masses rotating off-center, as shown in FIG. 3. Other examples may include masses translating side-to-side, such as a piezoelectric actuator. The vibrating mass 220 may be similar to that used in phones or other devices to provide vibrations while in "silent mode".

The control circuit 230 may include any component or combination of components to actuate the vibrating mass 220 according to a pattern. For example, the control circuit may include a system on chip, an application specific integrated circuit, a field programmable gate array, a microcontroller, a processor with instructions for execution stored in a memory, analog circuitry, digital circuitry, reprogrammable or programmable hardware, or any suitable combination thereof.

In some examples, the control circuit 230 may be external to the housing 210, e.g., the vibrating mass 220 may be driven by a smartphone or another computing device. As an alternative, the control circuit 230 may apply a controlled electric charge to the housing 210. The electric charge may operate to shock the user while providing the handwriting sample, thereby causing controlled contraction of the muscles and providing perturbations to the user's normal handwriting motion.

The communication interface 250 may include an interface for cloud/internet uplink. The communication interface 250 may be used to access a predetermined pattern for vibrating the vibrating mass 220 from a remote source. For example, if the system 200 is usable to create validated or verifiable samples for more than one verifying entity, the system 200 may use the communication interface 250 to access predetermined vibration patterns for each of the relevant entities. Some apparatus 200 do not have a communication interface 250. Some examples do not include a communication interface 250.

The accelerometer 260 may include any device and/or circuitry to detect the motion and patterns of the handwriting sample 50. The detected motion and patterns may be used to adapt the vibration pattern to the actual speed of the user.

FIG. 5 is a schematic drawing showing an example control circuit 230 for use with the system of FIG. 4. The control circuit 230 may include, for example, a microcontroller (MCU) 232 (with data encryption capability), a cryptography chip for validity/authentication (like the ATECC608 available from Microchip Technology, Inc. of Chandler, Arizona), and an actuator 234/236 (for the actual vibration). FIG. 2 shows the MCU 132 driving either a DC current motor 234 or a piezoelectric actuator 236.

FIG. 6 is a flowchart showing an example method 300 incorporating teachings of the present disclosure. Some methods incorporating teachings of the present disclosure, however, may include more or fewer elements than method 300, or may include performing these elements in a different order or not at all.

Method 300 begins at Step 310.

Step 320 includes accessing a predetermined vibration pattern stored in a memory corresponding to defined data. In some examples, the predetermined vibration pattern may be stored in a memory of a device or system for creating a handwriting sample with encoded data for increased identification rigor.

Step 322 includes receiving an encoded signal from an encryption server. The memory storing the predetermined vibration pattern may be associated with an encryption server and may provide the pattern to the device or system as an encoded signal. In some examples, the predetermined vibration pattern may be stored in the device and not on a server.

Step 324 includes decrypting the encoded signal to access the predetermined vibration pattern. In some embodiments, the signal may not be encoded and would not require decrypting.

Step 330 includes vibrating a stylus based on the predetermined vibration pattern during creation of the handwritten sample to encode the defined digital data into the handwriting sample. As described in relation to systems 100 and 200, vibrating a stylus may include rotating and offset mass or actuating a vibrating mass to vibrate the stylus from inside or to vibrate a housing attached to a user, such as a ring or a bracelet.

Step 340 includes sensing a movement of the stylus. The system may include an accelerometer operable to detect the motion and patterns of the handwriting sample. Some examples do not sense the movement of the stylus.

Step 350 includes adjusting the predetermined vibration pattern based on the sensed movement of the stylus. As hand movement may not have a constant speed (to allow a well-timed digital data insertion), the insertion of the digital vibration may be adjusted based on the readings of an accelerometer embedded in the vibrating device. To do so, some examples include adjusting the predetermined vibration pattern.

Step 360 includes scanning the handwritten sample to identify the defined data encoded in the handwriting sample. Handwriting or signature decoding, including data extraction, may be analyzed in any suitable manner, with any suitable device (e.g., devices fitted with a camera and imaging processing software) that can identify and decode the vibration-based data encoded in the handwriting or signature. Vibration-based encrypted or hashed data can be decrypted or checked for validity through pre-agreed procedures and algorithms within private applications, legally approved organizations or government institutions. For example, corporate or government entities may analyze the digital data in a handwriting sample to validate legal instruments, contracts, checks, etc.

Although examples have been described above, other variations may be made without departing from the spirit and scope of this disclosure.

I claim:

1. An apparatus comprising:
a stylus operable to dispense ink on a paper;
an accelerometer operable to detect motion of a handwriting sample;
a mass; and
a control circuit to:
actuate the mass to vibrate the stylus;
access a predetermined vibration pattern;
vibrate the mass to vibrate the stylus according to the predetermined vibration pattern;
sense, via the accelerometer, a movement of the stylus; and
adjust the predetermined vibration pattern based on the movement of the stylus.

2. The apparatus as recited in claim 1, further comprising a lock to block operation of the control circuit.

3. The apparatus as recited in claim 1, further comprising:
an ink dispenser; and
a lock to control a locked status of the ink dispenser.

4. The apparatus as recited in claim 1, wherein the control circuit operates to decrypt a signal to access the predetermined vibration pattern.

5. The apparatus as recited in claim 1, wherein the predetermined vibration pattern includes frequency and amplitude variations.

6. The apparatus as recited in claim 1, further comprising a direct current motor to actuate the vibrating mass.

7. The apparatus as recited in claim 1, further comprising a piezoelectric actuator to actuate the vibrating mass.

8. The apparatus as recited in claim 1, further comprising a communication interface to receive or transmit the predetermined vibration pattern.

9. The apparatus as recited in claim 1, wherein the control circuit includes a system on chip, an application specific integrated circuit, a field programmable gate array, a microcontroller, analog circuitry, or digital circuitry.

10. The apparatus as recited in claim 1, wherein the control circuit is external to the stylus.

11. A method, comprising:
actuating, by a control circuit, a mass of an apparatus to vibrate a stylus of the apparatus;
accessing, by the control circuit, a predetermined vibration pattern;
vibrating, by the control circuit, the mass to vibrate the stylus according to the predetermined vibration pattern;
sensing, by the control circuit via an accelerometer of the stylus, a movement of the stylus; and
adjusting, by the control circuit, the predetermined vibration pattern based on the movement of the stylus.

12. The method according to claim 11, further comprising:
decrypting, by the control circuit, a signal to access the predetermined vibration pattern.

13. The method according to claim 11, further comprising:
blocking, by a lock of the apparatus, operation of the control circuit.

14. The method according to claim 11, further comprising:
controlling, by a lock, a locked status of an ink dispenser of the apparatus.

15. The method according to claim 11, wherein the predetermined vibration pattern includes frequency and amplitude variations.

16. The method according to claim 11, wherein the vibrating, by the control circuit, the mass to vibrate the stylus according to the predetermined vibration pattern includes vibrating the mass to vibrate the stylus according to the predetermined vibration pattern by a direct current motor.

17. The method according to claim 11, wherein the vibrating, by the control circuit, the mass to vibrate the stylus according to the predetermined vibration pattern includes vibrating the mass to vibrate the stylus according to the predetermined vibration pattern by a piezoelectric actuator.

18. The method according to claim 11, wherein the accessing, by the control circuit, the predetermined vibration pattern includes receiving, via a communication interface of the apparatus, the predetermined vibration pattern.

19. The method according to claim 11, wherein the control circuit includes a system on chip, an application specific integrated circuit, a field programmable gate array, a microcontroller, analog circuitry, or digital circuitry.

20. The method according to claim 11, wherein the control circuit is external to the stylus.

\* \* \* \* \*